June 19, 1962 A. G. ELLIS 3,040,163
TRANSFER APPARATUS
Filed May 1, 1959 3 Sheets-Sheet 3
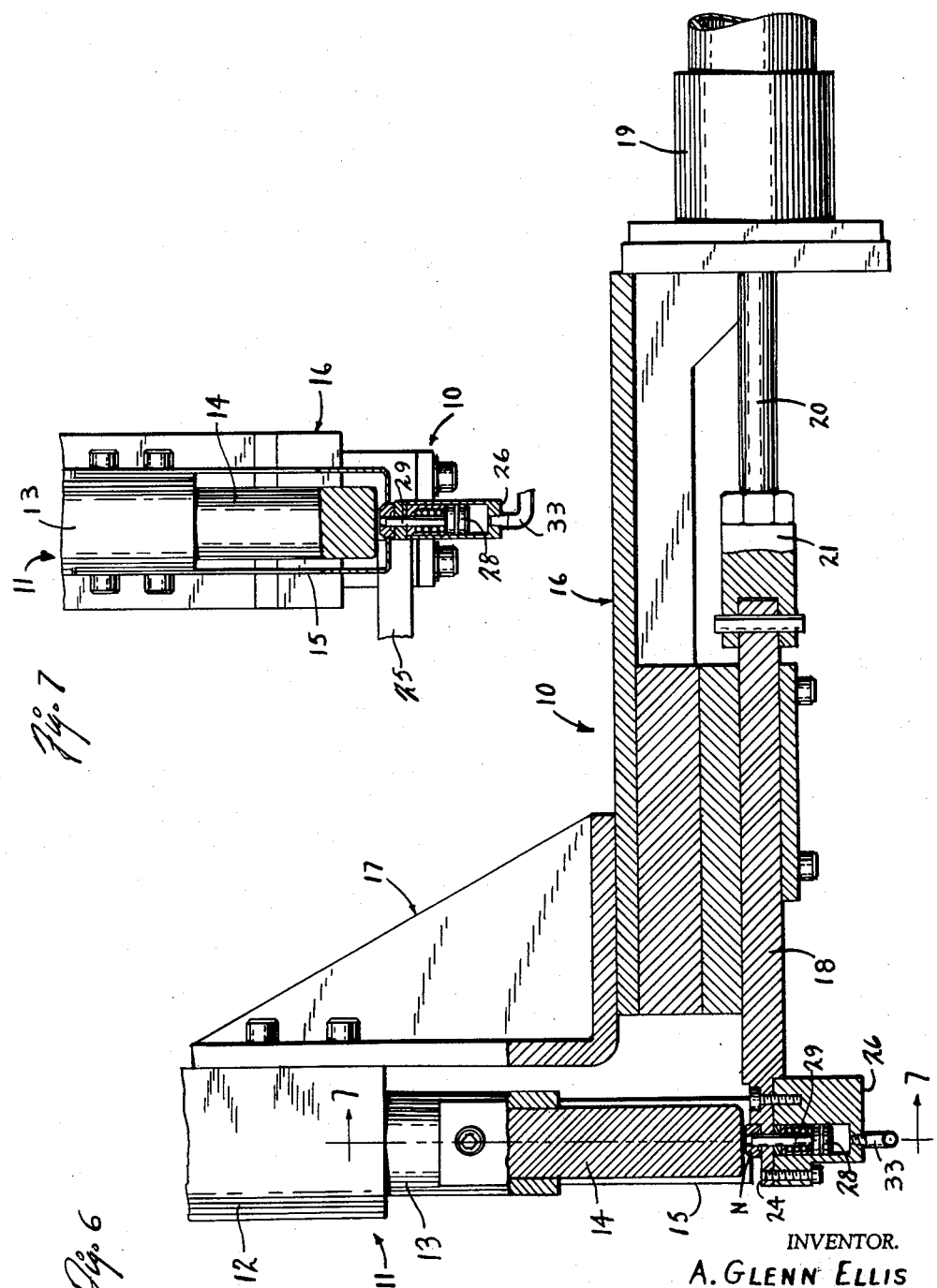
INVENTOR.
A. GLENN ELLIS
BY
Attorney

United States Patent Office 3,040,163
Patented June 19, 1962

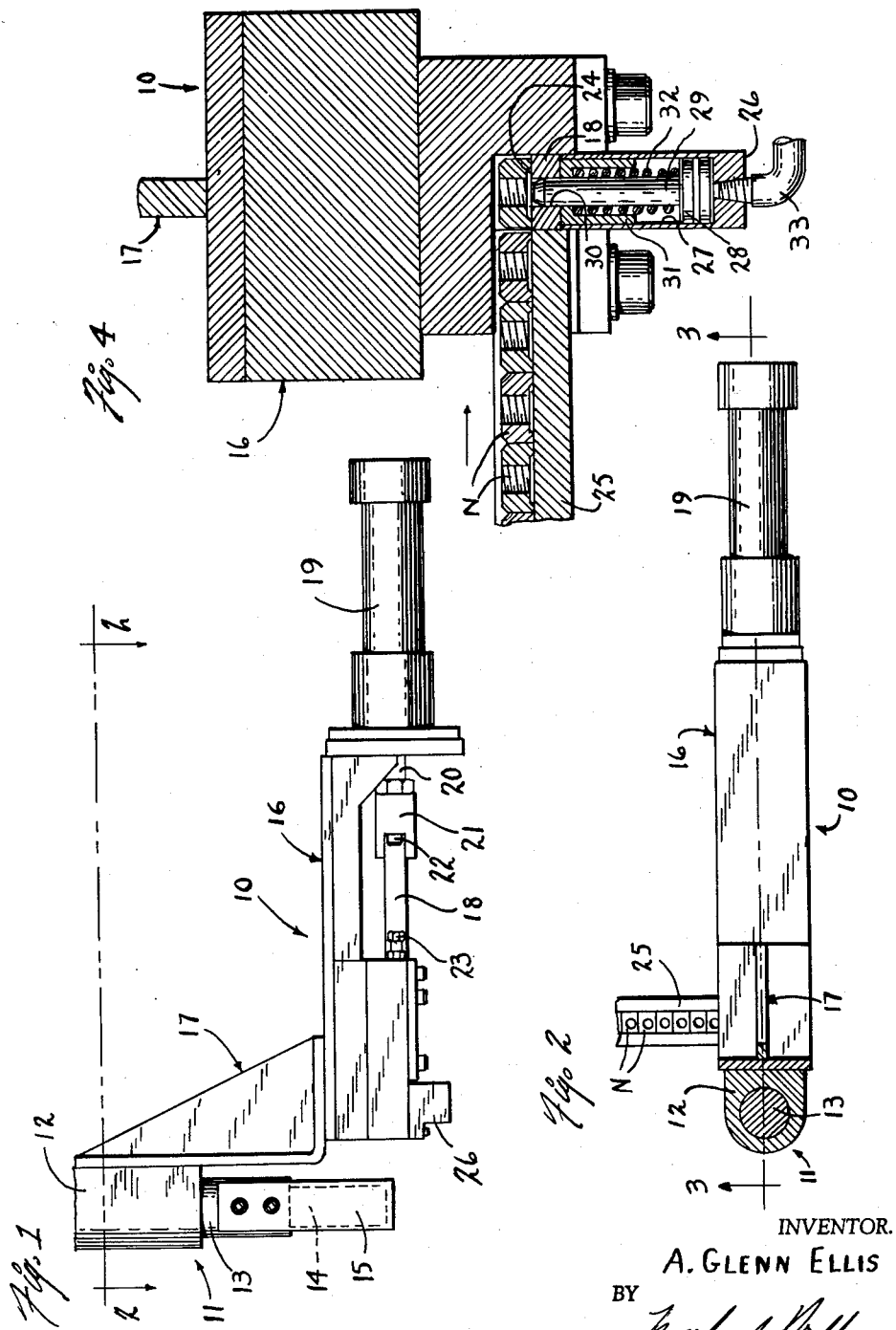

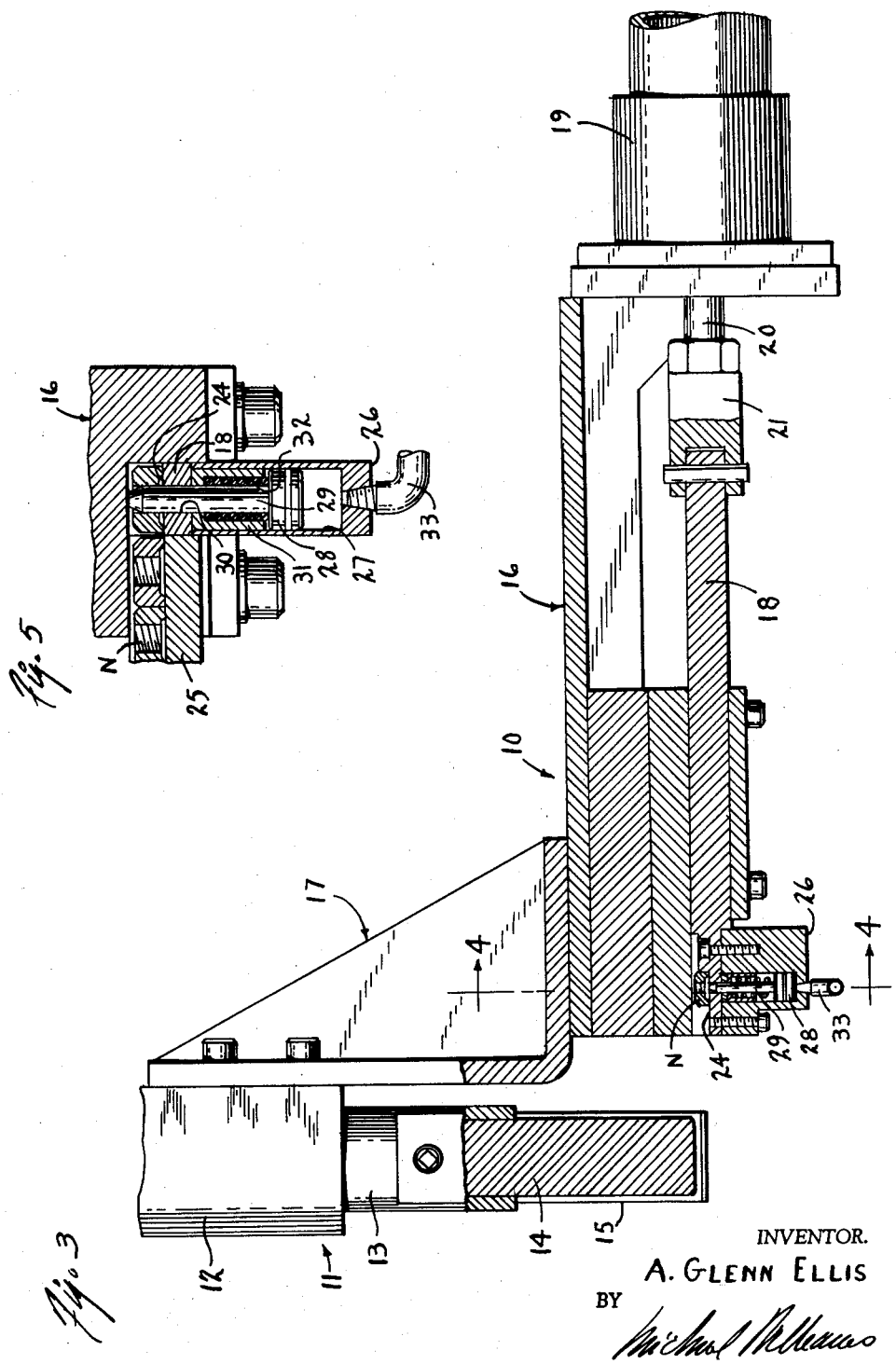

3,040,163
TRANSFER APPARATUS
Alonzo Glenn Ellis, Warren, Ohio, assignor, by mesne assignments, to The McKay Machine Company, Youngstown, Ohio, a corporation of Ohio
Filed May 1, 1959, Ser. No. 810,450
8 Claims. (Cl. 219—79)

The present invention relates to transfer apparatus, more particularly to apparatus for transfering apertured bodies from one position to another, and the principal object of the invention is to provide new and improved apparatus of the character described.

One of the major deficiencies of prior art transfer apparatus has been lack of reliability. For example, such prior art apparatus may, more or less frequently, so transfer a body that is improperly positioned for reception by the apparatus or device designed to receive it. Not infrequently, such apparatus failed completely to transfer a body at the required time.

While for many applications an occasional failure of the transfer apparatus to properly transfer a body at the required time is not such a disability as would render the apparatus wholly impractical, such a failure may, under certain circumstances, have just such an effect. For example, when a plurality of transfer devices are employed to transfer bodies to receiving apparatus which thereafter functions to simultaneously integrate such bodies into a complete assembly, a failure of only one of such transfer devices will render the entire assembly defective. Accordingly, it will be understood that under the circumstances above outlined it is of the utmost importance that the transfer apparatus function properly at all times.

The manner in which the present invention accomplishes a high degree of reliability and other advantages will readily become apparent from a study of the following description and from the drawings appended hereto.

In the drawings accompanying this specification and forming a part of this application, there is shown, for purpose of illustration, an embodiment which the invention may assume, and in these drawings:

FIGURE 1 is a side elevational view of a preferred embodiment of the present transfer apparatus shown in combination with a fragmentarily illustrated receiving device, FIGURE 2 is a sectional view generally corresponding to the line 2—2 of FIGURE 1, FIGURE 3 is an enlarged, fragmentary sectional view generally corresponding to the line 3—3 of FIGURE 2, FIGURE 4 is a further enlarged, fragmentary sectional view generally corresponding to the line 4—4 of FIGURE 3, FIGURE 5 is a fragmentary view similar to FIGURE 4 but with certain parts shown in another position, FIGURE 6 is a fragmentary view similar to FIGURE 3 but with certain parts shown in another position, and FIGURE 7 is a fragmentary view generally corresponding to the line 7—7 of FIGURE 6.

Referring to FIGURE 1, transfer apparatus 10 is shown associated with a fragmentarily illustrated welding head 11; however, it is to be understood that the use of a welding head is disclosed solely for purpose of illustration and that the present transfer apparatus may be used with any suitable apparatus designed to receive the bodies being transferred.

As presently disclosed, the welding head 11 comprises a fixed portion 12 in which a slide 13 is vertically shiftable by any conventional means. Slide 13 carries a welding electrode 14 together with opposed spring fingers 15 which will later be described with greater particularity.

Transfer apparatus 10 is herein shown to comprise a frame structure, or housing, 16 secured to the fixed portion 12 of the welding head 11 by means of a bracket structure 17. Reciprocably carried by the frame structure 17 is a slide member 18 which is guided for movement in a generally horizontal direction toward and away from the welding electrode 14. Any suitable means may be employed for reciprocating slide member 18; however, at the present time, a fluid cylinder 19 is carried by the frame structure 17 and has a piston rod 20 whose free end carries a clevis 21 which is pivotally connected to the right end (in the position of parts seen in FIGURES 1 and 3) of the slide member. As best seen in FIGURE 1, clevis 21 carries an abutment 22 which is engageable with the head of an adjustable stop screw 23 carried by the frame structure to limit movement of the slide member 18 to the left from the position seen in FIGURE 1.

Referring to FIGURE 3 and to the position of parts as therein shown, it will be noted that the left end of slide member 18 is notched at 24 to provide a seat for the particular bodies N to be transferred. At the present time, the bodies N comprise square nuts having a central threaded aperture; however, it will be evident that the present transfer apparatus is not limited to use with such bodies, but that other kinds of bodies may also be transferred by the application of the principles herein disclosed. In the present embodiment and as best seen in FIGURES 2 and 4, bodies N are adapted to be fed in single file in the direction of the arrow to seated relation with the seat 24 of the slide member 18 by means of a track, or guide channel 25, which projects from the frame, or housing, structure 16. Such guide channel may, if desired, have its free end connected with a suitable nut storage hopper or the like (not shown).

With reference to FIGURES 1, 3 and 4, a body 26 having an upright cylindrical bore 27 is secured to the underside of slide member 18 whereby such bore is aligned with a nut N disposed on seat 24. Slideable within such bore (see FIGURE 4) is a piston 28 having an upstanding plunger portion 29 of a transverse size to freely fit within a nut aperture. Plunger portion 29 slideably fits within an aperture 30 in the slide member which is aligned with bore 27. An apertured cap member 31 closes the top of bore 27 and a helical spring 32 is interposed between the cap member 31 and the piston 28 to resiliently urge the piston to the position seen in FIGURES 3 and 4 wherein plunger 29 is retracted from engagement with the nut disposed on the slide member seat 24. A suitable conduit 33 communicates with the lower end of bore 27 so that fluid under pressure may be admitted beneath piston 28 to urge the latter upwardly against the urging of spring 32 to the position seen in FIGURE 5 wherein plunger 29 has been inserted into the aperture of the seated nut.

With the construction thus far disclosed and assuming the various parts to be positioned as seen in FIGURES 1, 3 and 4, operation will be as follows: Fluid under pressure will first be admitted beneath piston 28 to urge plunger 29 upwardly to the position seen in FIGURE 5 wherein it is inserted within the aperture of the seated nut. Fluid under pressure will then be admitted to cylinder 19 to shift slide member 18 from the position seen in FIGURES 1 and 3 to the position seen in FIGURE 6 to thus transfer the seated nut beneath the welding electrode 14. It is to be understood that since the plunger 29 remains within the nut aperture, the nut will be accurately located on the slide member seat and will be retained thereon with no possibility of being shifted therefrom as a result of vibration or the like.

Referring now to FIGURE 7, wherein the seated nut is positioned beneath the welding electrode 14, it will be noted that the earlier mentioned opposed spring fingers 15 have their lower ends directed toward each other to resiliently grip the nut member as it is forced therebetween by movement of the slide member as above described.

Following disposition of the nut beneath the electrode 14 and between the spring fingers 15 as seen in FIGURES 6 and 7, the fluid pressure beneath piston 28 will be exhausted thus allowing spring 32 to withdraw the plunger 29 from the nut aperture. Following such withdrawal of the plunger 29, fluid will be admitted to cylinder 19 to shift slide member 18 from the position seen in FIGURE 6 to the position seen in FIGURE 3. Upon such movement of the slide member, the latter will be withdrawn from beneath the previously supported nut thus leaving the latter supported in position beneath the electrode 14 by means of the spring fingers 15.

Upon the return of slide member 18 to the position seen in FIGURE 3, the next successive nut will move onto slide member seat 24 so that another transfer operation cycle may begin. Obviously, before slide member 18 once again moves to the position seen in FIGURE 6, the welder will be actuated to weld the nut held by the spring fingers to a suitable body or the like so that the spring fingers will be free to receive the next nut transferred by the slide member.

In view of the foregoing it will be apparent to those skilled in the art that I have accomplished at least the principal object of my invention and it will also be apparent to those skilled in the art that the embodiment herein described may be variously changed and modified, without departing from the spirit of the invention, and that the invention is capable of uses and has advantages not herein specifically described, hence it will be appreciated that the herein disclosed embodiment is illustrative only, and that my invention is not limited thereto.

I claim:

1. Transfer apparatus for apertured bodies comprising a housing, means for guiding the apertured bodies in single file relation along a predetermined path to said housing, a slide member reciprocably carried by said housing and having a seat for receiving the foremost apertured body following its passage along said path, a plunger reciprocably carried by said slide member adjacent said body seat and in one position extending into the body aperture to insure retention of the body on said seat and in another position retracting from the body aperture to provide for ready movement of a body onto said seat and ready movement of the body from said seat, resilient means yieldably urging said plunger to said other position, piston means disposed within a cylinder bore and connected with said plunger to effect movement thereof to said one position against the urging of said resilient means when opposite sides of said piston means are exposed to differential fluid pressure, and means for reciprocating said slide member between a body-receiving position and a body-discharging position.

2. The construction of claim 1 wherein said plunger is shifted to said one position against the urging of said resilient means upon exposure of said piston means to differential fluid pressure following disposition of said slide member in its body-receiving position, and wherein said plunger is shifted to its other position by said resilient means following disposition of said slide member in its body-discharging position.

3. Transfer apparatus for apertured bodies comprising a reciprocable slide member having a seat for receiving one of said bodies, means for guiding movement of a body to said seat in a direction transversely of member movement, a plunger carried by said member for reciprocation in a direction transversely of body movement to said seat, in one position said plunger extending into the body aperture to insure retention of the body on said seat and in another position said plunger retracting from the body aperture to provide for ready movement of a body onto said seat and ready movement of a body from said seat, means for reciprocating said slide member between a body-receiving position and body-discharging position, and means for shifting said plunger to said one position following disposition of said slide member in its body-receiving position and movement of a body onto said seat and for shifting said plunger to said other position upon disposition of said slide member in its body-discharging position.

4. In an automatic nut loading and welding machine, a welding electrode reciprocable along a predetermined axis toward and away from a workpiece to which a nut is to be welded, a pair of jaws movable with said electrode and disposed on opposite sides of and springpressed toward said axis and normally spaced apart a distance less than the width of a nut, a slide member having a seat for receiving a nut, a track for guiding nuts of the same size to said slide member, the latter being movable toward said track to dispose its seat in position for reception of a nut from said track and movable in an opposite direction to dispose its seat and the nut thereon in alignment with said predetermined axis, the nut on said seat slidably engaging said jaws during movement of said slide in said opposite direction and camming said jaws apart enough to fit between and be frictionally retained by the same, movement of said slide to withdraw its seat from alignment with said predetermined axis causing withdrawal of said seat from supporting said nut and leaving the latter supported by said jaws, whereby movement of said electrode, and consequently of said jaws, will position said nut against said workpiece for welding by said electrode.

5. The construction of claim 4 wherein said jaws are automatically stripped from the welded nut by movement of said electrode, and consequently said jaws, in a direction away from said workpiece.

6. The construction according to claim 4 wherein said seat is formed by a notch in said slide, the notch having a bottom wall upon which said nut rests and a side wall confining said nut laterally, said side wall having an opening directed toward said predetermined axis and of a size to freely pass the nut whereby the latter is withdrawn from said notch when the nut is supported by said jaws and said slide member is moved to said track for disposition of its seat for the reception of subsequent nut.

7. The construction according to claim 4 wherein said slide member has a plunger which is projected into the hole in the nut and which remains so projected until the nut is gripped by said jaws, whereupon it is withdrawn from the nut hole.

8. The construction according to claim 4 wherein flat springs are secured in position on opposite sides of said electrode, the free ends of said springs being turned in toward each other and spaced slightly from the welding surface of said electrode, said free ends providing said jaws.

References Cited in the file of this patent

UNITED STATES PATENTS

| | | |
|---|---|---|
| 1,963,036 | Trolley | June 12, 1934 |
| 2,078,694 | Smith | Apr. 27, 1937 |
| 2,110,832 | Hogg et al. | Mar. 8, 1938 |
| 2,325,507 | Guirl et al. | July 27, 1943 |
| 2,518,850 | Akeroyd | Aug. 15, 1950 |
| 2,649,975 | Brooks | Aug. 25, 1953 |
| 2,662,646 | McCain | Dec. 15, 1953 |
| 2,685,018 | Mynar | July 27, 1954 |
| 2,717,086 | Bush | Sept. 6, 1955 |
| 2,787,700 | Kalbow | Apr. 2, 1957 |
| 2,852,123 | Heidergott | Sept. 16, 1958 |
| 2,905,803 | Brady | Sept. 22, 1959 |
| 2,956,664 | Brown | Oct. 18, 1960 |